(12) United States Patent
Krauss

(10) Patent No.: US 7,980,566 B2
(45) Date of Patent: Jul. 19, 2011

(54) PNEUMATIC RIDE LEVEL CONTROL SYSTEM

(75) Inventor: Hans-Peter Krauss, Garbsen (DE)

(73) Assignee: Continental Aktiengesellschaft, Hannover (DE)

( * ) Notice: Subject to any disclaimer, the term of this patent is extended or adjusted under 35 U.S.C. 154(b) by 227 days.

(21) Appl. No.: 12/091,771

(22) PCT Filed: Oct. 5, 2006

(86) PCT No.: PCT/EP2006/067086
§ 371 (c)(1),
(2), (4) Date: Apr. 28, 2008

(87) PCT Pub. No.: WO2007/048689
PCT Pub. Date: May 3, 2007

(65) Prior Publication Data
US 2008/0246234 A1 Oct. 9, 2008

(30) Foreign Application Priority Data
Oct. 28, 2005 (DE) .......................... 10 2005 052 148

(51) Int. Cl.
*B60G 17/04* (2006.01)
(52) U.S. Cl. .................................. 280/5.514
(58) Field of Classification Search ............... 280/5.502, 280/5.505, 5.506, 5.507, 5.508, 5.509, 5.514, 280/124.103, 124.106
See application file for complete search history.

(56) References Cited

U.S. PATENT DOCUMENTS

| | | | |
|---|---|---|---|
| 3,552,767 A | 1/1971 | Yew et al. | |
| 3,572,676 A | 3/1971 | Yew | |
| 4,633,761 A | 1/1987 | Schweikert | |
| 4,826,141 A | 5/1989 | Buma et al. | |
| 6,056,277 A | 5/2000 | Wode | |
| 2002/0166321 A1 | 11/2002 | Oldenettel | |
| 2003/0047853 A1 | 3/2003 | Behmenburg | |
| 2004/0050042 A1* | 3/2004 | Frazer | 60/413 |

FOREIGN PATENT DOCUMENTS

| | | |
|---|---|---|
| DE | 10327485 | 5/2005 |
| JP | 8156566 | 6/1996 |

* cited by examiner

*Primary Examiner* — Faye M. Fleming
(74) *Attorney, Agent, or Firm* — Brinks Hofer Gilson & Lione

(57) ABSTRACT

Disclosed is a ride level control system for a motor vehicle composed of a pneumatic spring (1), a connecting line (3) which connects the pneumatic spring (1) to an atmospheric port (5), and a first valve (2) which, in a first switched state, disconnects the connecting line (3) and, in a second switched state, clears it, wherein a vessel (4) is arranged in the connecting line (3) between the first valve (2) and the atmospheric port (5).

13 Claims, 3 Drawing Sheets

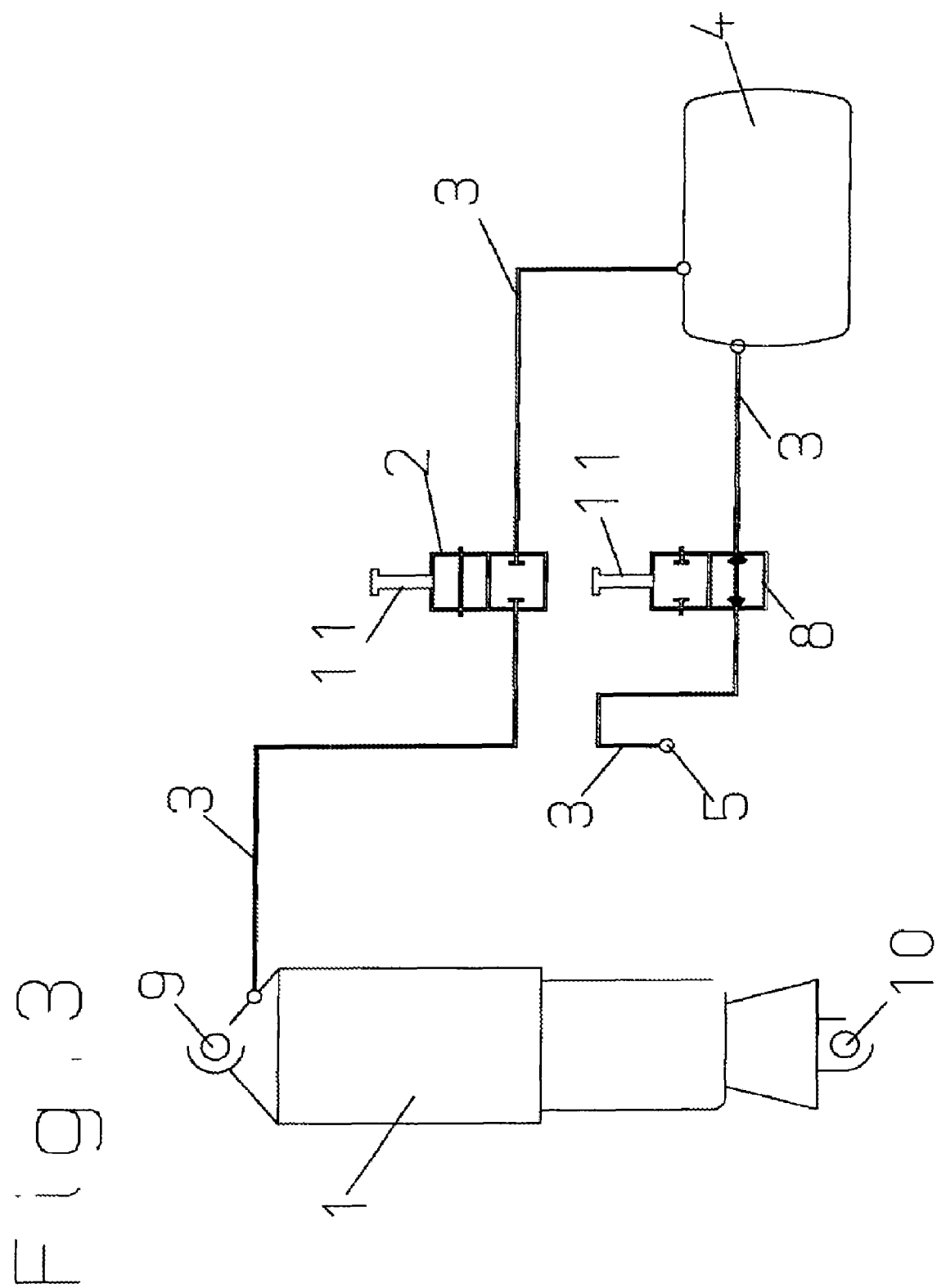

US 7,980,566 B2

PNEUMATIC RIDE LEVEL CONTROL SYSTEM

This application is the U.S. national phase of international application PCT/EP06/67086 filed Oct. 5, 2006, which designated the U.S. and which claims the benefit of priority of German Patent Application Number 10 2005 52148.7 filed Oct. 28, 2005. The contents of each of the aforementioned documents are incorporated herein in their entirety.

BACKGROUND OF THE INVENTION

The invention relates to a pneumatic ride level control system for a motor vehicle composed of a pneumatic spring, a connecting line which connects the pneumatic spring to an atmospheric port, and a first valve which, in a first switched state, disconnects the connecting line and, in a second switched state, clears it.

In modern motor vehicles, pneumatic springs are being used to an increasing degree in suspension systems since they permit comfortable suspension and adjustment of the ride level of the motor vehicle frame with respect to the underlying surface. For reasons of vehicle movement dynamics and driving safety it is highly significant that the ride level which is set after loading or unloading of the vehicle has taken place no longer changes, in particular while traveling.

Document DE19710399C2 discloses an arrangement having an air spring and an additional volume, in which the additional volume is connected to the air spring by means of a connecting line which has a large cross section. The connecting line can be cleared or disconnected by means of a valve, depending on the level of comfort required of the suspension. Such air suspension systems are usually equipped with an electronic or pneumatic ride level control system which is complicated in design and costly and therefore expensive.

Application document DE102004043492.1, which was not published before the priority date of the present document, discloses a device for identifying the reference driving position of a motor cycle which is provided with pneumatic suspension. The device has a spirit level in the field of vision of the driver so that the driver or some other person can change the pressure in the pneumatic spring when the motor cycle is stationary, before travel is started, and can therefore set the ride level of the motor cycle. This can either by done by filling the pneumatic spring by means of a hand pump or a pressurized gas bottle in order to raise the ride level or by opening a valve and letting out some of the compressed air from the pneumatic spring into the atmosphere. A disadvantage with this arrangement is that the driver cannot change the ride level while traveling, the ride level having been adjusted, for example, as a result of a change in temperature of the pressurized gas inside the pneumatic spring. In particular the described discharge function can be carried out by the driver only in the stationary state of the motor cycle, and even then only with a restricted degree of accuracy owing to the discharge valve which is activated by the driver and the opening time behavior of said valve.

The invention is therefore based on the object of providing a pneumatic ride level control system of the type mentioned at the beginning in which an at least incremental change in the ride level can be carried out easily by the driver of the motor vehicle while the vehicle is traveling.

SUMMARY OF THE INVENTION

The object is achieved by arranging a vessel in the connecting line between the first valve and the atmospheric port in the pneumatic ride level control system. An advantage of the invention is the fact that the ride level of the motor vehicle can be reduced incrementally by the driver himself using simple means while traveling, in which case the discharge process is carried out largely independently of loading and pressure. For this purpose, the pneumatic spring is firstly connected to the vessel so that pressure medium is transferred from the pneumatic spring into the unpressurized vessel up to a pressure equilibrium at maximum. In the state of a pressure equilibrium, the opening of the first valve no longer influences the lowering of the ride level. Instead, the lowering of the ride level is influenced by the volume of the vessel and the pressure gradient from the pneumatic spring to the vessel with a usually atmospheric starting pressure. The pressure in the vessel is then discharged into the atmosphere. During the lowering process of the ride level control system, the vessel is located between the pneumatic spring and the atmospheric port, in order to avoid undesirably excessive lowering of the ride level but to permit a certain degree of lowering of the ride level.

According to one development of the invention, the first valve, in a first switched state, disconnects the connection between the pneumatic spring and the vessel and at the same time clears the connection between the vessel and the atmospheric port, and the first valve, in a second switched state, clears the connection between the pneumatic spring and the vessel and at the same time disconnects the connection between the vessel and the atmospheric port. An advantage of this development is the fact that the lowering function of the ride level control system can be carried out by means of a single valve using simple means, which in particular saves costs.

According to one development of the invention, the first valve, in a first switched state, disconnects the connection between the pneumatic spring and the vessel, and a second valve, in the first switched state, clears the connection between the vessel and the atmospheric port, and the first valve, in a second switched state, clears the connection between the pneumatic spring and the vessel, and the second valve, in the second switched state, disconnects the connection between the vessel and the atmospheric port. An advantage of this development is the fact that the lowering function can be carried out using simple and cost-effective valves, and the design of the connecting lines can be made particularly simple.

According to one development of the invention, the pneumatic spring can be connected to a filling port in the first switched state of the first valve and of the second valve. An advantage is the fact that no additional filling port is required on the pneumatic spring but rather the latter is arranged in or on the corresponding valve. A further advantage of this development of the invention is that a simultaneous filling and lowering process of the pneumatic spring is prevented.

According to one development of the invention, a nonreturn valve which closes from the pneumatic spring to the filling port and opens from the filling port to the pneumatic spring is arranged in the first valve. An advantage of this development of the invention is that pressure medium can be fed exclusively to the pneumatic spring via the filling port and no pressure medium can be discharged.

According to one development of the invention, the volume of the vessel is less than five percent of the volume of the pneumatic spring. The lowerable level of the pneumatic spring during a lowering process is determined by the volume of the vessel and the pressure gradient from the pneumatic spring to the vessel, and the volume of the vessel is therefore a decisive parameter for the maximum difference in level of the pneumatic spring which can be achieved in a lowering process. The maximum difference in level of a lowering process then results from the ratio of the vessel volume to the loadbearing area of the pneumatic spring. An advantage of this development is the fact that there is a simple and direct relationship between the volume ratio and the maximum achievable difference in level of a lowering process.

According to one development of the invention, the volume of the vessel is 0.5% of the volume of the pneumatic spring. An advantage of this development is the fact that in this way a difference in level or change in the level at the pneumatic spring or the vehicle frame with respect to the underlying surface is in the region of 1 mm with the pneumatic spring volumes which are customary today, and this represents a good compromise between the comfort of the lowering process (a low lowering speed) and the highest possible lowering speed.

According to one development of the invention, the volume of the vessel is selected such that the level of the pneumatic spring when the pneumatic spring is connected to the vessel is reduced by 10 mm or less. An advantage of this development is the fact that in this way the maximum possible lowering speed of the pneumatic spring and/or of the vehicle frame with respect to the underlying surface/the wheel carrier of the vehicle is made possible, in which case, under certain circumstances, consideration has to be given to the transmission ratio of the axial kinematics.

According to one development of the invention, the volume of the vessel is selected such that the level of the pneumatic spring when the pneumatic spring is connected to the vessel is reduced in the range from 0.1 mm to 2 mm. The advantage is due to the fact that this range constitutes a good compromise between a low speed of the change in ride level, which is desired for reasons of comfort, and a high speed of the change in ride level, which is necessary for reasons of road safety, in order always to maintain a ride level which is as balanced as possible.

According to one development of the invention, the valve is a 3/2-way or a 4/2-way valve. An advantage is the fact that these types of valve can be manufactured easily and cost-effectively and require little installation space. The circuitry can therefore be made very compact in design.

According to one development of the invention, the first and/or the second valve can be activated mechanically. An advantage is the fact that the corresponding valve can be made easily and cost-effectively and can be operated by the driver himself. There is no need for any additional switching devices or connecting lines.

According to one development of the invention, the first and second valves and the vessel are arranged in a component or an assembly at a location which the driver of the motor vehicle can access manually while traveling. An advantage of the invention is the fact that the driver can easily carry out a lowering process while traveling, without being distracted from the actual events on the road. A further advantage is the compact design.

According to one development of the invention, the location is on the steering wheel or steering device of the motor vehicle. An advantage is the fact that the triggering device for the lowering process, for example a pushbutton key, is located in the direct field of vision of the driver and so can be operated easily and safely.

According to one development of the invention, the first valve and/or the second valve can be activated electrically. An advantage is the fact that electric valves are particularly small and compact and have a high level of functional reliability and a long service life.

According to one development of the invention, the first valve and/or the second valve can be activated pneumatically. An advantage is the fact that electric valves are particularly small and compact and have a high level of functional reliability and do not require any additional switching medium, for example electricity.

According to one development of the invention, the first and/or the second valve and the vessel are arranged directly on the pneumatic spring or are integrated into the pneumatic spring, and a switching device for the first valve and/or the second valve is arranged at a location which the driver of the motor vehicle can access manually while traveling. An advantage is the fact that the triggering device for the lowering process, for example a pushbutton key, is located in the direct field of vision of the driver and can therefore be operated easily and safely and the other components of the ride level control system are arranged in a very compact design in the vehicle. This facilitates, inter alia, the mounting of the ride level control system in the vehicle. A further advantage is the space-saving arrangement of the pneumatic spring, valve and vessel in the vehicle.

According to one development of the invention, the motor vehicle is a two-wheeled vehicle or three-wheeled vehicle. In particular, a pneumatic ride level control system can be applied in motor cycles and trikes. An electronically controlled pneumatic ride level control system is usually not possible in two-wheeled or three-wheeled vehicles, for example motor cycles and trikes, for reasons of cost and weight. The mechanical level control valves which are known from the field of utility vehicles are also not suitable for these vehicles, on the one hand in terms of their control behavior and also for reasons of cost and weight. An advantage of this development of the invention is the embodiment of a ride level control system in a way which is simple, cost-effective and optimized in terms of weight. A further advantage is the possibility of lowering the level in a relatively precise way with satisfactory adjustment and metering while traveling.

BRIEF DESCRIPTION OF THE DRAWINGS

Exemplary embodiments and further advantages of the invention are explained in conjunction with the figures below, in which:

FIG. 3 shows a third circuit arrangement for a ride level control system.

DETAILED DESCRIPTION OF THE DRAWINGS

Figure 1:
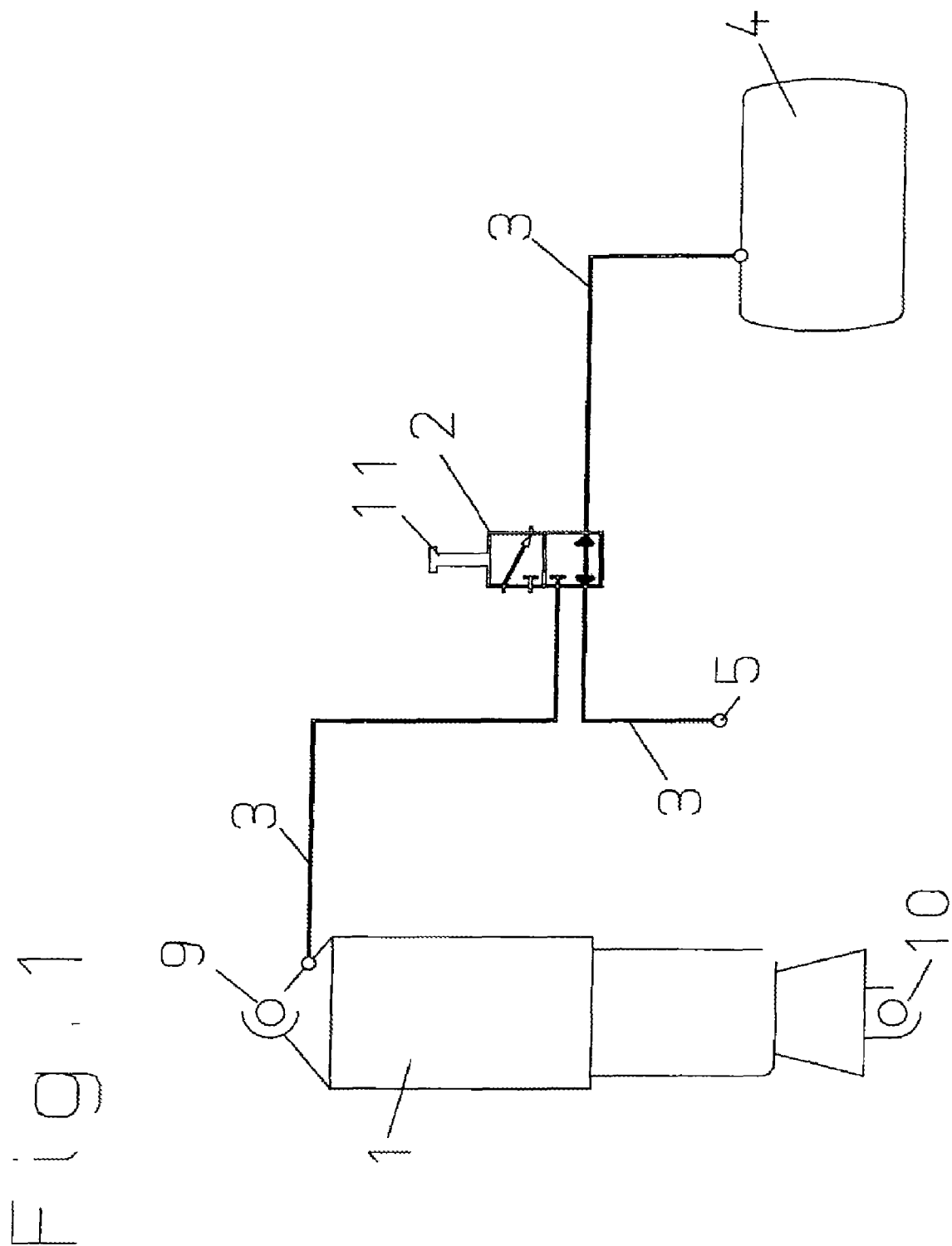
FIG. 1 shows a first circuit arrangement for a ride level control system.

FIG. 1 shows a pneumatic spring 1 which is connected via a connecting line 3 to an atmospheric port 5, with a first valve 2 being arranged between the atmospheric port 5 and the pneumatic spring 1. A vessel is arranged between the first valve 2 and the atmospheric port 5. The pneumatic spring 1 can be mounted, by means of a first attachment point 9, on the vehicle frame or the vehicle chassis (not illustrated), and by means of a second attachment point 10 on a wheel carrier (not shown) of a vehicle, or vice versa.

In the first switched state of the first valve 2 which is shown, the connecting line 3 is disconnected from the pneumatic spring 1 to the vessel 4, and the connecting line 3 is cleared from the vessel 4 to the atmospheric port 5 so that pressure medium can escape from the vessel 4 into the atmosphere, and the pressure of the pressure medium in the vessel 4 corresponds to the atmospheric pressure. In the second switched state of the first valve 2 which is shown, the connecting line 3 is cleared from the pneumatic spring 1 to the vessel 4 so that pressure medium can be transferred from the pneumatic spring 1 into the container 4, and the connecting line 3 is disconnected from the vessel 4 to the atmospheric port 5, so that no pressure medium can escape from the vessel 4 into the atmosphere, and the pressure of the pressure medium in the vessel 4 corresponds to the atmospheric pressure. Irrespective of the time for which the first valve 2 is in the second switched state, pressure medium is only transferred from the pneumatic spring 1 into the vessel 4 until a pressure equilibrium is established. As a result, during an activation process of the triggering device 11 of the first valve 2 the ride level of the pneumatic spring 1 can be reduced at maximum by a predefined value which is predefined by the volume of the vessel 4.

If the triggering device 11 is no longer activated and the first valve 2 changes over from the second (not shown) switched state into the first, illustrated switched state, the connection between the pneumatic spring 1 and the vessel 4 is disconnected and the connection between the vessel 4 and the atmospheric port 5 is established again so that the pressure medium is transferred from the vessel 4 into the atmosphere. If the triggering device 11 is then no longer activated for a certain time, a pressure equilibrium then exists between the atmospheric port 5 and the vessel 4, which usually means atmospheric pressure.

The first valve 2 can, as shown, be embodied as an electrically activatable 3/2-way valve. It is also possible to activate the first valve 2 mechanically or pneumatically, in which case a mechanical or a pneumatic triggering device 11 is then provided. The desired adjustment of level and the desired ride level of the motor vehicle can be set in stages or incrementally through the frequency and the duration (as a maximum up to pressure equilibrium between the pneumatic spring 1 and vessel 4) of the activation of the triggering device 11 by the driver of the motor vehicle, in which case in some motor vehicles it is necessary to take into consideration the transmission ratio of the axial kinematics or wheel kinematics.

The block diagram of a pneumatic ride level control system shown in FIG. 1 is preferably used for the rear axle of motor cycles or what are referred to as trikes.

For example, the pneumatic spring 1 of a motor cycle has a loadbearing area of approximately 100 cm$^2$ so that given a volume of the vessel 4 of approximately 10 cm$^3$ the ride level of the pneumatic spring 1 is reduced by approximately 1 mm. In this context, an exemplary transmission ratio of the spring travel of 2.5 has to be taken into consideration so that the 1 mm difference in level at the pneumatic spring 1 corresponds to a difference in level of 2.5 mm at the motor cycle. In order to lower the vehicle frame by approximately 20 mm, the triggering device 11 of the first valve 2 would have to be activated at least eight times.

A significant change in the ride level of the pneumatic spring 1 occurs if the gas volume within the pneumatic spring 1 has significantly expanded as a result of a rise in temperature due to an external or internal heat effect. This can occur, for example, as a result of inputting of heat/thermal radiation due to the vehicle brakes, the engine or the exhaust system of the vehicle. However, it is also possible for the heat within the pneumatic spring 1 to be generated by said pneumatic spring 1 itself, for example due to air suspension and air damping when the pneumatic spring is excited frequently. This situation can occur in motor cycles on an uneven underlying surface and when they are subjected to particularly high stress, such as is the case, for example, in motor sports, for example during rally driving.

The ride level control system according to the invention can also be used on an axle of a passenger car or utility vehicle, in which case two pneumatic springs 1 per axle (one per vehicle wheel) should normally be used and the pneumatic circuit is to be accordingly multiplied or expanded. The pneumatic springs 1 which are used may be plain air springs of a folding bellows, rolling bellows or double rolling bellows design as well as air spring struts, which constitute a combination of an air spring and a hydraulic shock absorber. Furthermore, it is possible to use a pneumatic spring damper as a pneumatic spring 1, in which case both the suspension and the damping are performed by the pneumatic spring damper. Such embodiments of pneumatic springs 1 are adequately known so that reference is made to a more detailed description thereof in, inter alia, the abovementioned prior art. The pressure medium used is preferably air, while any other gas, for example $CO_2$, or mixture of gases can be used.

Figure 2:
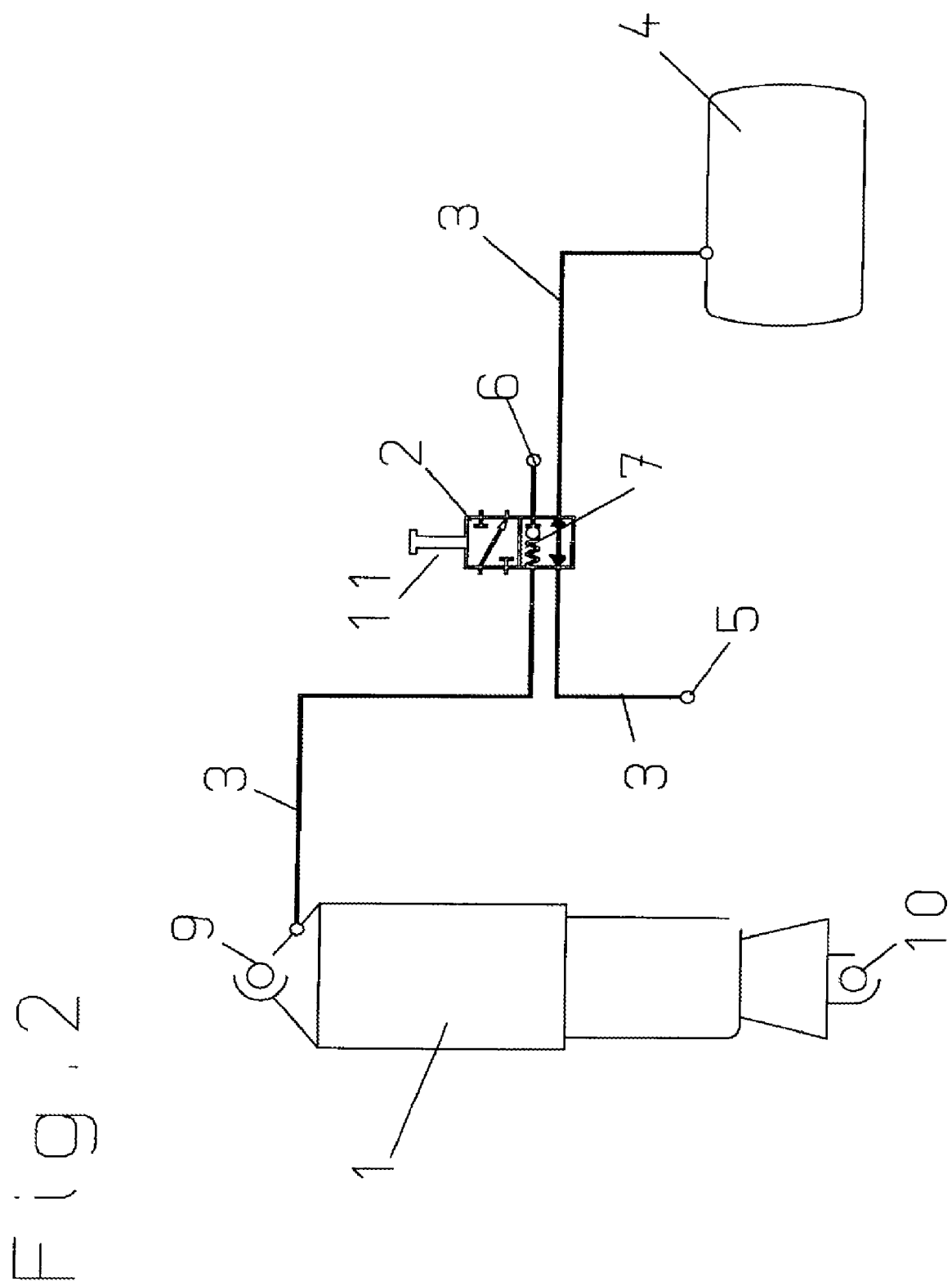
FIG. 2 shows a second circuit arrangement for a ride level control system.

The schematic circuit arrangement of a ride level control system illustrated in FIG. 2 differs from the circuit arrangement in FIG. 1 in that the first valve 2 is embodied as a 4/2-way valve. The further port of the first valve 2 relates to a filling port 6. There is therefore the possibility of also filling the pneumatic spring 1 with pressure medium via the first valve 2 if necessary. In addition, in the first switched state of the first valve 2, the connection from the pneumatic spring 1 to the filling port 6 is disconnected by a nonreturn valve 7. As a result of the nonreturn valve 7 it is only possible to transfer pressure medium from the filling port 6 into the pneumatic spring 1. For all other functions of the illustrated ride level control system, reference is made to the description of FIG. 1.

The circuit arrangement illustrated in FIG. 3 differs from the circuit arrangement in FIG. 1 in that the function of the 3/2-way valve 2 is divided into a first 2/2-way valve 2 and second 2/2-way valve 8. The first valve 2 disconnects, in a first switched state, the connection between the pneumatic spring 1 and the vessel 4, and a second valve 8 clears, in the first switched state, the connection between the vessel 4 and the atmospheric port 5. The first valve 2 clears, in a second switched state, the connection between the pneumatic spring 1 and the vessel 4, and the second valve 8 disconnects, in the second switched state, the connection between the vessel 4 and the atmospheric port 5. The first valve 2 can also be embodied as a 3/2-way valve so that a further port, which can be connected to the filling port, is present. All the other functions of the ride level control system in FIG. 3 are disclosed in conjunction with the description of FIG. 1.

LIST OF REFERENCE SYMBOLS

Part of the Description

1 Pneumatic spring
2 First valve
3 Connecting line
4 Vessel
5 Atmospheric port
6 Filling port
7 Nonreturn valve
8 Second valve
9 First attachment point
10 Second attachment point
11 Triggering device

The invention claimed is:

1. A pneumatic ride level control system for a motor vehicle comprising a pneumatic spring (1), a vessel (4), and a first valve that includes:
a first port in communication with the pneumatic spring,
a second port in communication with the vessel, and
a third port in communication with atmosphere,
wherein the valve is switchable between first and second positions, the first position closing the first port while connecting the second and third ports and the second position connecting the first and second ports.

2. The pneumatic ride level control system as claimed in claim 1, wherein the volume of the vessel (4) is less than five percent of the volume of the pneumatic spring (1).

3. The pneumatic ride level control system as claimed in claim 2, wherein the volume of the vessel (4) is in the range of 0.5% of the volume of the pneumatic spring (1).

4. The pneumatic ride level control system as claimed in claim 1, wherein the volume of the vessel (4) is selected such that the level of the pneumatic spring (1) when the pneumatic spring (1) is connected to the vessel (4) is reduced by 10 mm or less.

5. The pneumatic ride level control system as claimed in claim 4, wherein the volume of the vessel (4) is selected such that the level of the pneumatic spring (1) when the pneumatic spring (1) is connected to the vessel (4) is reduced in the range from 0.1 mm to 2 mm.

6. The pneumatic ride level control system as claimed in claim 1, wherein the first valve (2) can be activated mechanically.

7. The pneumatic ride level control system as claimed in claim 1, wherein the first valve (2) can be activated electrically.

8. The pneumatic ride level control system as claimed in claim 1, wherein the first valve (2) can be activated pneumatically.

9. The pneumatic ride level control system as claimed in claim 1, wherein the vessel (4) is arranged directly on the pneumatic spring (1) or is integrated into the pneumatic spring (1).

10. The pneumatic ride level control system as claimed in claim 1, wherein the motor vehicle is a two-wheeled or three-wheeled vehicle.

11. The pneumatic ride level control system as claimed in claim 1, further comprising a second valve wherein the second valve (8), in a first switching position, connects the vessel (4) with the atmospheric port (5), and, in a second switching position, disconnects the vessel (4) from the atmospheric port (5), and wherein the first valve and the second valve both occupy their first positions at the same time.

12. The pneumatic ride level control system as claimed in claim 11, wherein the second valve (8) can be activated in the same way as the first valve.

13. The pneumatic ride level control system as claimed in claim 11, wherein an actuator of the second valve (8) is arranged in a location accessible to the driver of the motor vehicle.

\* \* \* \* \*